United States Patent
Mogler et al.

(10) Patent No.: US 7,856,359 B2
(45) Date of Patent: Dec. 21, 2010

(54) SYSTEM AND METHOD FOR AIRLINE PURCHASING PROGRAM MANAGEMENT

(75) Inventors: Brian Mogler, Tempe, AZ (US); Andrew Winterton, Hoboken, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1198 days.

(21) Appl. No.: 10/188,768

(22) Filed: Jul. 2, 2002

(65) Prior Publication Data

US 2003/0110062 A1   Jun. 12, 2003

Related U.S. Application Data

(60) Provisional application No. 60/302,639, filed on Jul. 2, 2001, provisional application No. 60/306,125, filed on Jul. 17, 2001.

(51) Int. Cl.
*G06Q 10/00* (2006.01)
(52) U.S. Cl. .......................................... 705/1.1
(58) Field of Classification Search .................. 705/5, 705/80, 1.1
See application file for complete search history.

(56) References Cited

U.S. PATENT DOCUMENTS

| | | | |
|---|---|---|---|
| 4,359,631 A | 11/1982 | Lockwood et al. | |
| 4,449,186 A | 5/1984 | Kelly et al. | |
| 4,490,810 A | 12/1984 | Hon | |
| 4,818,854 A | 4/1989 | Davies et al. | |
| 4,845,625 A | 7/1989 | Stannard | |
| 4,862,357 A | 8/1989 | Ahlstrom et al. | |
| 4,922,439 A | 5/1990 | Greenblatt | |
| 4,965,763 A | 10/1990 | Zamora | |
| 5,021,953 A | 6/1991 | Webber et al. | |
| 5,056,019 A | 10/1991 | Schultz et al. | |
| 5,155,678 A | 10/1992 | Fukumoto et al. | |
| 5,191,523 A | 3/1993 | Whitesage | |
| 5,235,509 A | 8/1993 | Mueller et al. | |
| 5,235,680 A | 8/1993 | Bijnagte | |

(Continued)

FOREIGN PATENT DOCUMENTS

EP        0762306        3/1997

(Continued)

OTHER PUBLICATIONS

Web Ventures Announces Version 4 of "BookIt PRO—Gives Full Travel Agent Access to Airline Computer Reservations Systems Over the Internet", Oct. 1998; PR Newswire; dialog copy, 2 pgs.

(Continued)

*Primary Examiner*—Shannon S Saliard
(74) *Attorney, Agent, or Firm*—Snell & Wilmer L.L.P.

(57) ABSTRACT

A method and system for air carrier contract management and optimization is disclosed. In particular, a system is described that facilitates travel contract optimization by generating contract terms and conditions desirable for optimizing client expenditure. Once the contract terms and conditions are determined, a yield management system facilitates compliance with contract terms and conditions by generating and providing selling instructions to booking systems to facilitate compliance with contract terms by travelers. Booking activity is provided back to yield management system to update contract compliance system and to revise selling instructions accordingly.

20 Claims, 9 Drawing Sheets

U.S. PATENT DOCUMENTS

| | | |
|---|---|---|
| 5,237,499 A | 8/1993 | Garback |
| 5,239,480 A | 8/1993 | Huegel |
| 5,241,671 A | 8/1993 | Reed et al. |
| 5,253,165 A | 10/1993 | Leiseca et al. |
| 5,253,166 A | 10/1993 | Dettelbach et al. |
| 5,255,184 A | 10/1993 | Hornick et al. |
| 5,270,921 A | 12/1993 | Hornick |
| 5,274,758 A | 12/1993 | Beitel et al. |
| 5,287,278 A | 2/1994 | Rau |
| 5,289,371 A | 2/1994 | Abel et al. |
| 5,331,546 A | 7/1994 | Webber et al. |
| 5,393,964 A | 2/1995 | Hamilton et al. |
| 5,408,417 A | 4/1995 | Wilder |
| 5,422,809 A | 6/1995 | Griffin et al. |
| 5,459,306 A | 10/1995 | Stein et al. |
| 5,483,444 A | 1/1996 | Heintzeman et al. |
| 5,526,443 A | 6/1996 | Nakayama |
| 5,570,283 A | 10/1996 | Shoolery et al. |
| 5,581,461 A | 12/1996 | Coll et al. |
| 5,598,557 A | 1/1997 | Doner et al. |
| 5,644,721 A | 7/1997 | Chung et al. |
| 5,648,900 A | 7/1997 | Bowen et al. |
| 5,652,842 A | 7/1997 | Siegrist, Jr. et al. |
| 5,675,723 A | 10/1997 | Ekrot et al. |
| 5,687,322 A | 11/1997 | Deaton et al. |
| 5,761,442 A | 6/1998 | Barr et al. |
| 5,764,981 A | 6/1998 | Brice et al. |
| 5,781,892 A | 7/1998 | Hunt et al. |
| 5,809,478 A | 9/1998 | Grfeco et al. |
| 5,812,134 A | 9/1998 | Pooser et al. |
| 5,832,451 A | 11/1998 | Flake et al. |
| 5,832,453 A * | 11/1998 | O'Brien ........................ 705/6 |
| 5,832,454 A | 11/1998 | Jafre et al. |
| 5,839,114 A | 11/1998 | Lynch et al. |
| 5,842,176 A | 11/1998 | Hunt et al. |
| 5,857,175 A | 1/1999 | Day et al. |
| 5,884,272 A | 3/1999 | Walker et al. |
| 5,894,311 A | 4/1999 | Jackson |
| 5,894,475 A | 4/1999 | Bruno et al. |
| 5,897,620 A | 4/1999 | Walker et al. |
| 5,909,510 A | 6/1999 | Nakayama |
| 5,918,022 A | 6/1999 | Batz et al. |
| 5,918,209 A | 6/1999 | Campbell et al. |
| 5,926,798 A | 7/1999 | Carter |
| 5,940,803 A | 8/1999 | Kanemitsu |
| 5,948,040 A | 9/1999 | DeLorme et al. |
| 5,953,706 A | 9/1999 | Patel |
| 5,960,383 A | 9/1999 | Fleischer |
| 5,968,125 A | 10/1999 | Garrick et al. |
| 5,974,396 A | 10/1999 | Anderson et al. |
| 5,983,246 A | 11/1999 | Takano |
| 5,987,252 A | 11/1999 | Leino et al. |
| 5,995,939 A | 11/1999 | Berman et al. |
| 5,999,728 A | 12/1999 | Cable |
| 6,009,403 A | 12/1999 | Sato |
| 6,009,408 A | 12/1999 | Buchanan |
| 6,012,069 A | 1/2000 | Shibazaki |
| 6,018,715 A | 1/2000 | Lynch et al. |
| 6,018,718 A | 1/2000 | Walker et al. |
| 6,023,679 A | 2/2000 | Acebo et al. |
| 6,024,288 A | 2/2000 | Gottlich et al. |
| 6,028,601 A | 2/2000 | Machiraju et al. |
| 6,029,144 A | 2/2000 | Barrett et al. |
| 6,067,532 A | 5/2000 | Gebb |
| 6,070,147 A | 5/2000 | Harms et al. |
| 6,085,164 A | 7/2000 | Smith et al. |
| 6,085,169 A | 7/2000 | Walker et al. |
| 6,085,976 A | 7/2000 | Sehr |
| 6,101,477 A | 8/2000 | Hohle et al. |
| 6,112,185 A | 8/2000 | Walker et al. |
| 6,118,989 A | 9/2000 | Abe et al. |
| 6,119,094 A | 9/2000 | Lynch et al. |
| 6,119,095 A | 9/2000 | Morita |
| 6,119,096 A | 9/2000 | Mann et al. |
| 6,119,229 A | 9/2000 | Martinez et al. |
| 6,121,969 A | 9/2000 | Jain et al. |
| 6,122,642 A | 9/2000 | Mehovic |
| 6,134,534 A | 10/2000 | Walker et al. |
| 6,148,290 A | 11/2000 | Dan et al. |
| 6,151,582 A | 11/2000 | Huang et al. |
| 6,157,915 A | 12/2000 | Bhaskaran et al. |
| 6,157,918 A | 12/2000 | Shepherd |
| 6,163,771 A | 12/2000 | Walker et al. |
| 6,167,368 A | 12/2000 | Wacholder |
| 6,185,524 B1 | 2/2001 | Carus et al. |
| 6,185,558 B1 | 2/2001 | Bowman et al. |
| 6,185,592 B1 | 2/2001 | Boguraev et al. |
| 6,188,989 B1 | 2/2001 | Kennedy |
| 6,195,644 B1 | 2/2001 | Bowie |
| 6,199,147 B1 | 3/2001 | Smith et al. |
| 6,223,163 B1 | 4/2001 | Van Luchene |
| 6,229,534 B1 | 5/2001 | Gerra et al. |
| 6,263,315 B1 | 7/2001 | Talluri |
| 6,292,790 B1 | 9/2001 | Krahn et al. |
| 6,304,850 B1 | 10/2001 | Keller et al. |
| 6,324,517 B1 | 11/2001 | Bingham et al. |
| 6,336,097 B1 | 1/2002 | Scipioni |
| 6,442,526 B1 | 8/2002 | Vance et al. |
| 6,477,520 B1 | 11/2002 | Malaviya et al. |
| 6,754,634 B1 | 6/2004 | Ho |
| 6,785,608 B1 | 8/2004 | Milici et al. |
| 6,804,658 B2 | 10/2004 | Lim et al. |
| 6,839,679 B1 | 1/2005 | Lynch et al. |
| 6,944,133 B2 | 9/2005 | Wisner et al. |
| 6,963,854 B1 | 11/2005 | Boyd et al. |
| 7,016,859 B2 | 3/2006 | Whitesage |
| 7,050,986 B1 | 5/2006 | Vance et al. |
| 7,165,036 B2 | 1/2007 | Kruk et al. |
| 7,302,399 B1 | 11/2007 | Donovan et al. |
| 2001/0005831 A1 | 6/2001 | Lewin et al. |
| 2001/0029478 A1 | 10/2001 | Laster et al. |
| 2001/0034626 A1 * | 10/2001 | Gillespie ........................ 705/6 |
| 2001/0047289 A1 | 11/2001 | Mckee et al. |
| 2001/0049693 A1 | 12/2001 | Pratt |
| 2001/0051885 A1 | 12/2001 | Nardulli et al. |
| 2001/0054105 A1 | 12/2001 | Furusawa et al. |
| 2002/0010604 A1 | 1/2002 | Block |
| 2002/0013774 A1 | 1/2002 | Morimoto |
| 2002/0077871 A1 | 6/2002 | Udelhoven et al. |
| 2002/0143587 A1 | 10/2002 | Champernowne |
| 2002/0147823 A1 | 10/2002 | Healy |
| 2002/0152100 A1 | 10/2002 | Chen et al. |
| 2002/0152101 A1 | 10/2002 | Lawson et al. |
| 2002/0178034 A1 * | 11/2002 | Gardner et al. ................. 705/5 |
| 2003/0040946 A1 | 2/2003 | Sprenger et al. |
| 2003/0055690 A1 | 3/2003 | Garback |
| 2003/0110063 A1 | 6/2003 | Among et al. |
| 2003/0115159 A1 | 6/2003 | Gillespie |
| 2003/0120526 A1 | 6/2003 | Altman et al. |
| 2003/0140007 A1 | 7/2003 | Kramer et al. |
| 2003/0144867 A1 | 7/2003 | Campbell et al. |
| 2004/0260581 A1 | 12/2004 | Baranowski et al. |
| 2004/0267623 A1 | 12/2004 | Vivadelli et al. |
| 2005/0015295 A1 | 1/2005 | McCulloch |
| 2006/0111956 A1 * | 5/2006 | Whitesage ...................... 705/8 |
| 2006/0146806 A1 | 7/2006 | Khuc et al. |
| 2006/0212321 A1 * | 9/2006 | Vance et al. ..................... 705/5 |
| 2007/0055555 A1 | 3/2007 | Baggett et al. |

FOREIGN PATENT DOCUMENTS

| | | |
|---|---|---|
| FR | 2586316 | 2/1987 |
| JP | 2002-32682 | 1/2002 |
| WO | WO 95/26007 | 9/1995 |

| | | | |
|---|---|---|---|
| WO | WO/97/17680 A1 | 5/1997 | |
| WO | WO 01/04823 A2 | 1/2001 | |
| WO | WO 01/61607 | 8/2001 | |
| WO | WO 02/29672 | 4/2002 | |

OTHER PUBLICATIONS

Maritz Deal, www.findarticles.com, Feb. 14, 2000.
"The Table Lens: Merging Graphical and Symbolic Representations in an Interactive Focus + Context Visualization for Tabular Information", by R. Rao and S. Card, Human Factors in Computing Systems, CHI '94, "Celebrating Independence", pp. 318-322, 481-482.
"An Evaluation of Statistical Approaches to Text Categorization", Yiming Yang, Apr. 10, 1997, CMU-CS-97-I27.
thefreedictionary.com website; Dec. 12, 2005; 1 page.
Orbitz website; Sep. 30, 2001, Wayback Machine web archive site, 1 page.
Travelocity website; Nov. 21, 2001, Wayback Machine web archive site, 2 pages.
Fichter and Cervone; Documents, Data Information Retrieval, & XML; document retrieval: difficulties of retrieving information from document repositories Online Nov. 1, 2000.
"Chapter 3—Memory Management", Linuxhq.com/guides/tIk/mm/memory.html, copyright 1996-1999.
"Memory Offset Annotation", tacc.utexas.edu/services/userguides/intel/ref/ann-mem.htm.
Clemons, Eric K., et al., Ahead of the Pack Through Vision and Hustle: A Case Study of Information Technology at Rosenbluth Travel, Proceedings of the Twenty-Fourth Annual Hawaii International Conference on System Sciences, vol. 4, Jan. 1991, pp. 287-296.
Greenberg, Ilan, Travelnet to help corporations stem travel expense tide InfoWorld, vol. 17, No. 29, Jul. 17, 1995, p. 25.
Rosenbluth International and AT&T to Provide Business New Travel Solution PR Newswire, Jul. 19, 1995.
Clemons, Eric K., et al., Rosenbluth International: Strategic Transformation of a Successful Enterprise Proceedings of the Thirty Second Hawaii International Conference on System Sciences, 1999.
DiFlorio, Dionino, et al., Air Deal Manager: American Express Provides an End to End Purchasing Management Solution SAS Conferences XVII SEUGI, Jun. 1999.
Rosenbluth International Files Suit Against Travel Analytics for Violation of Patent Infringement Laws, PR Newswire, Mar. 17, 2000.
Jones, David, Modeling Tools Mature, Business Travel News, vol. 18, Jan. 15, 2001.
Navigant International Launches Unique Internet-Accessible, Intuitive Reporting Platform, PR Newswire, Jan. 18, 2001.
DiFlorio, Diono, et al., Air Deal Manager: Corporate Travel Expense Optimisation with the SAS System SAS Converence XIX SEUGI, May-Jun. 2001.
Campbell, Jay, Dacoda opens for biz: Rosenbluth launches contract optimization service for non-clients, Business Travel News, vol. 18, No. 24, Nov. 12, 2001.
Simbologica Web Pages, Simbologica, http://www.simbologica.it, Oct. 2006.
Shepherd, David, SLAM Model of Domestic Airline Passenger Fairs and the Contract Air Service Program, Air Force Institute of Technology, Sep. 1986.
Travel Manager's Workstation, Travel Systems Institute, 1993, pp. 9-35.
Fee, John, "Through the Electronic Looking Glass into Living Pictures", Popular Science, Aug. 1981, pp. 68-70.
Yan, et al., "L-CATA: A Logic-Based Expert Travel System", Computer Science in Economics and Management 4; Aug. 1, 1991, pp. 151-163.
ITT Business Travel News, Jul. 15, 1996, ISSN# 8750-3670, p. 36.
American Express unveils "American Express @ Work, new desktop portal for corporate travel & purchasing", by PR Newswire, Jul. 19, 1999.
Gerwig, Kate, "Online Corporate Traveler", InternetWeek, Sep. 14, 1998.
"American Express launches B2B travel booking technology for mid-sized companies", Canada Newswire, May 29, 2000.
"American Express launches online business travel fulfillment services", PR Newswire, Oct. 16, 2000.
Rogers, et al., "An adaptive interactive agent for route advice", ACM, 1999.
Friedman, et al., "Bias in computer systems", ACM, 1996.
Linden, et al., "Interactive assessment of user preference models: The automated travel assistant", white paper by the Department of Computer Science and Engineering, University of Washington, 1996.
Clemons, et al., "The Nature of Competition in Electronic Markets: An Empirical investigation of the electronic travel agent market", Wise, 1997.
Clemons, et al., "The Nature of Competition in Electronic Markets: An Empirical investigation of the electronic travel agent offerings", white paper by the Department of Operations and Information Management, The Wharton School, Jun. 1999.
Kowtko, et al, "Data collection and analysis in the air travel planning domain", DARPA Speech and Natural Language Workshop 1989.
Upton, Gill, "Deals on Wheels", Supply Management, Jan. 15, 1998.
"BookIt! Is the internet booking engine of choice for online travel reservations" PR Newswire, Feb. 17, 1999.
"British Airways: Fifty pluses take flight online", M2 Presswire, Feb. 26, 2001.
Yenckel, James, "Thrifty fliers find network of routes to fare deals", Chicago Sun Times, Feb. 17, 1991.
Coyne, Robert M., "Global connectivity", Hotel & Motel Management, Apr. 22, 1996, vol. 211 Issue 7, p. 28.
Straayer, Russell, "Overview of Frame Relay", www.dcbnet.com/notes/framerl.html, Mar. 1997.
Techfest, "Asynchronous Transfer Mode Overview", www.techfest.com, Aug. 17, 2000.
Non-Final Office Action dated Feb. 5, 2009 in U.S. Appl. No. 10/347,105.
Final Office Action dated Feb. 6, 2009 in U.S. Appl. No. 11/468,228.
Final Office Action dated Feb. 6, 2009 in U.S. Appl. No. 11/468,237.
Non-Final Office Action dated Feb. 13, 2009 in U.S. Appl. No. 10/708,542.
ISR dated Oct. 25, 2002 in Serial No. PCT/US02/21160.
ISR dated Mar. 8, 2004 in Serial No. PCT/US/03/36991.
ISR dated May 7, 2003 for PCT/US03/01718.
Final Office Action dated May 2, 2008 in U.S. Appl. No. 11/468,241.
Notice of Allowance dated Nov. 18, 2008 in U.S. Appl. No. 10/611,037.
Non-Final Office Action dated Oct. 19, 2007 in U.S. Appl. No. 10/611,037.
Non-Final Office Action dated Oct. 8, 2008 in U.S. Appl. No. 11/468,241.
Advisory Action dated Jul. 16, 2008 in U.S. Appl. No. 11/468,241.
Final Office Action dated May 15, 2008 in U.S. Appl. No. 10/611,037.
Advisory Action dated Jul. 29, 2008 in U.S. Appl. No. 10/611,037.
Non-Final Office Action dated Sep. 5, 2008 in U.S. Appl. No. 10/611,037.
Non-Final office Action dated Oct. 6, 2005 in U.S. Appl. No. 10/708,542.
Final Office Action dated Apr. 5, 2006 in U.S. Appl. No. 10/708,542.
Non-Final Office Action dated Nov. 16, 2006 in U.S. Appl. No. 10/708,542.
Final Office Action dated Jul. 23, 2007 in U.S. Appl. No. 10/708,542.
Non-Final Office Action dated Jan. 28, 2008 in U.S. Appl. No. 10/708,542.
Final Office Action dated Sep. 3, 2008 in U.S. Appl. No. 10/708,542.
Non-Final Office Action dated May 12, 2003 in U.S. Appl. No. 10/217,666.
Final Office Action dated Oct. 29, 2003 in U.S. Appl. No. 10/217,666.
Advisory Action dated Jan. 9, 2004 in U.S. Appl. No. 10/217,666.
Non-Final Office Action dated Apr. 15, 2004 in U.S. Appl. No. 10/217,666.
Final Office Action dated Dec. 30, 2004 in U.S. Appl. No. 10/217,666.
Advisory Action dated Mar. 11, 2005 in U.S. Appl. No. 10/217,666.
Non-Final Office Action dated Jun. 7, 2005 in U.S. Appl. No. 10/217,666.
Final Office Action dated Oct. 13, 2005 in U.S. Appl. No. 10/217,666.

Advisory Action dated Dec. 19, 2005 in U.S. Appl. No. 10/217,666.
Non-Final Office Action dated Mar. 20, 2006 in U.S. Appl. No. 10/217,666.
Final Office Action dated Oct. 16, 2006 in U.S. Appl. No. 10/217,666.
Advisory Action dated Dec. 26, 2006 in U.S. Appl. No. 10/271,666.
Non-Final Office Action dated Feb. 15, 2007 in U.S. Appl. No. 10/217,666.
Final Office Action dated Jul. 26, 2007 in U.S. Appl. No. 10/217,666.
Non-Final Office Action dated Dec. 19, 2007 in U.S. Appl. No. 10/217,666.
Notice of Allowance dated May 19, 2008 in U.S. Appl. No. 10/217,666.
Requirement for Restriction/Election dated Aug. 21, 2006 in U.S. Appl. No. 10/347,105.
Non-Final Office Action dated Oct. 31, 2006 in U.S. Appl. No. 10/347,105.
Final Office Action dated Apr. 5, 2007 in U.S. Appl. No. 10/347,105.
Advisory Action dated Jun. 12, 2007 in U.S. Appl. No. 10/347,105.
Non-Final Office Action dated Sep. 25, 2007 in U.S. Appl. No. 10/347,105.
Final Office Action dated Jan. 29, 2008 in U.S. Appl. No. 10/347,105.
Advisory Action dated Mar. 7, 2008 in U.S. Appl. No. 10/347,105.
Non-Final Office Action dated Apr. 17, 2008 in U.S. Appl. No. 10/347,105.
Final Office Action dated Oct. 20, 2008 in U.S. Appl. No. 10/347,105.
Non-Final Office Action dated Feb. 15, 2008 in U.S. Appl. No. 11/468,228.
Final Office Action dated May 19, 2008 in U.S. Appl. No. 11/468,228.
Advisory Action dated Jul. 21, 2008 in U.S. Appl. No. 11/468,228.
Non-Final Office Action dated Oct. 8, 2008 in U.S. Appl. No. 11/468,228.
Non-Final Office Action dated Mar. 22, 2007 in U.S. Appl. No. 11/468,237.
Final Office Action dated Sep. 21, 2007 in U.S. Appl. No. 11/468,237.
Non-Final Office Action dated Jan. 16, 2008 in U.S. Appl. No. 11/468,237.
Final Office Action dated May 19, 2008 in U.S. Appl. No. 11/468,237.
Advisory Action dated Jul. 16, 2008 in U.S. Appl. No. 11/468,237.
Non-Final Office Action dated Oct. 7, 2008 in U.S. Appl. No. 11/468,237.
Non-Final Office Action dated Mar. 8, 2007 in U.S. Appl. No. 11/468,241.
Final Office Action dated Sep. 7, 2007 in U.S. Appl. No. 11/468,241.
Non-Final Office Action dated Jan. 28, 2008 in U.S. Appl. No. 11/468,241.
Botter, Mary Ellen, "Travel Notes", Mar. 15, 1992, Denver Post, p. 2.T.
Final Office Action dated May 26, 2009 in U.S. Appl. No. 10/347,105.
Advisory Action dated Jul. 29, 2009 in U.S. Appl. No. 10/347,105.
Non-Final Office Action dated May 26, 2009 in U.S. Appl. No. 11/468,228.
Non-Final Office Action dated May 26, 2009 in U.S. Appl. No. 11/468,237.
Final Office Action dated May 5, 2009 in U.S. Appl. No. 11/468,241.
Advisory Action dated Jul. 30, 2009 in U.S. Appl. No. 11/468,241.
Notice of Allowance dated Nov. 18, 2008 in U.S. Appl. No. 11/611,037.
Final Office Action mailed Aug. 18, 2009 in U.S. Appl. No. 10/708,542.
Non-Final Office Action mailed May 19, 2009 in U.S. Appl. No. 10/908,544.
Non-Final Office Action mailed Oct. 2, 2009 in U.S. Appl. No. 11/468,241.
Final Office Action mailed Oct. 16, 2009 in U.S. Appl. No. 11/468,237.
Advisory Action mailed Dec. 17, 2009 in U.S. Appl. No. 11/468,237.
Final Office Action mailed Oct. 15, 2009 in U.S. Appl. No. 11/468,228.
Advisory Action mailed Dec. 17, 2009 in U.S. Appl. No. 11/468,228.
Final Office Action mailed Dec. 9, 2009 in U.S. Appl. No. 10/908,544.
Non-Final Office Action mailed Oct. 2, 2009 in U.S. Appl. No. 10/347,105.
Non-Final Office Action mailed Dec. 9, 2009 in U.S. Appl. No. 11/831,602.
Examiner Interview Summary mailed Oct. 21, 2009 in U.S. Appl. No. 10/708,542.
Advisory Action mailed Oct. 28, 2009 in U.S. Appl. No. 10/708,542.
Non-Final Office Action mailed Nov. 19, 2009 in U.S. Appl. No. 10/708,542.
"First Integrated Online Travel Management System Offers Cost Control, Compliance with Corporate Travel Policy: Sixth Largest Navigant International first Major User", Jul. 7, 1999, Baltimore-Business Wire, 1 pg.
Travelguidessoftware.com (Nov. 27, 1999) 12 pgs.
Galileo.com, "Galileo International Subsidiary Quantitude, Inc. Begins Global Network Pullout," Jul. 31, 2000, http://galileo.com/galileo/en-us/news/Press/Released/Archive/1007/07/Qauntitude+Roll+Out+July+31+2000.htm.
Galileo International Inc. Annual Report (10-k) Item 1. Business Mar. 31, 2001, pp. 1-24.

* cited by examiner

Yield Management System
CONTROL SHEET

CLIENT NAME:
CLIENT CODE:

Compete the Control Sheet by providing the following information using the BOS-SFO as an example:
CXR The selected airlines, in alphabetical order, for the O&D market.
CITY ONE First city in O&D market, listed in alphabetical order.
CITY TWO Second city in O&D market, listed in alphabetical order.
TARGET SHARE % Desired target share for airline in O&D market.
PRIORITY The priority ranking for the airline in the O&D market
MESSAGE TO DISPLAY Message that you want displayed for each carrier in the O&D market, maximum 55 characters/spaces per message
*tie-breaker: highest priority wins (by city pair)

| CXR | CITY ONE | CITY TWO | TARGET SHARE % | PRIORITY* | MESSAGE TO DISPLAY |
|---|---|---|---|---|---|
| AA | EWR | ORD | 35 | 1 | Book AA in this Market! it is client Preferred and Mandated! |
| UA | EWR | ORD | 40 | 2 | Book UA in this Market! it is client Preferred |
| CO | EWR | ORD | 25 | 3 | Book CO in this Market! it is client Preferred |
| AA | IAH | ORD | 30 | 2 | Book AA in this Market! it is client Preferred |
| UA | IAH | ORD | 45 | 1 | Book UA in this Market! it is client Preferred |
| CO | IAH | ORD | 25 | 3 | Book CO in this Market! it is client Preferred |
| UA | ATL | DEN | 60 | 1 | Book UA in this Market! it is client Preferred |
| DL | ATL | DEN | 40 | 2 | Book DL in this Market! it is client Preferred |

Contract terms and conditions are entered into a central database

INPUT

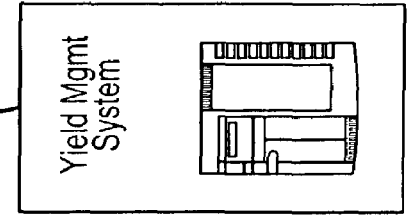

Yield Mgmt System 575

SEE FIG.5

FIG.4

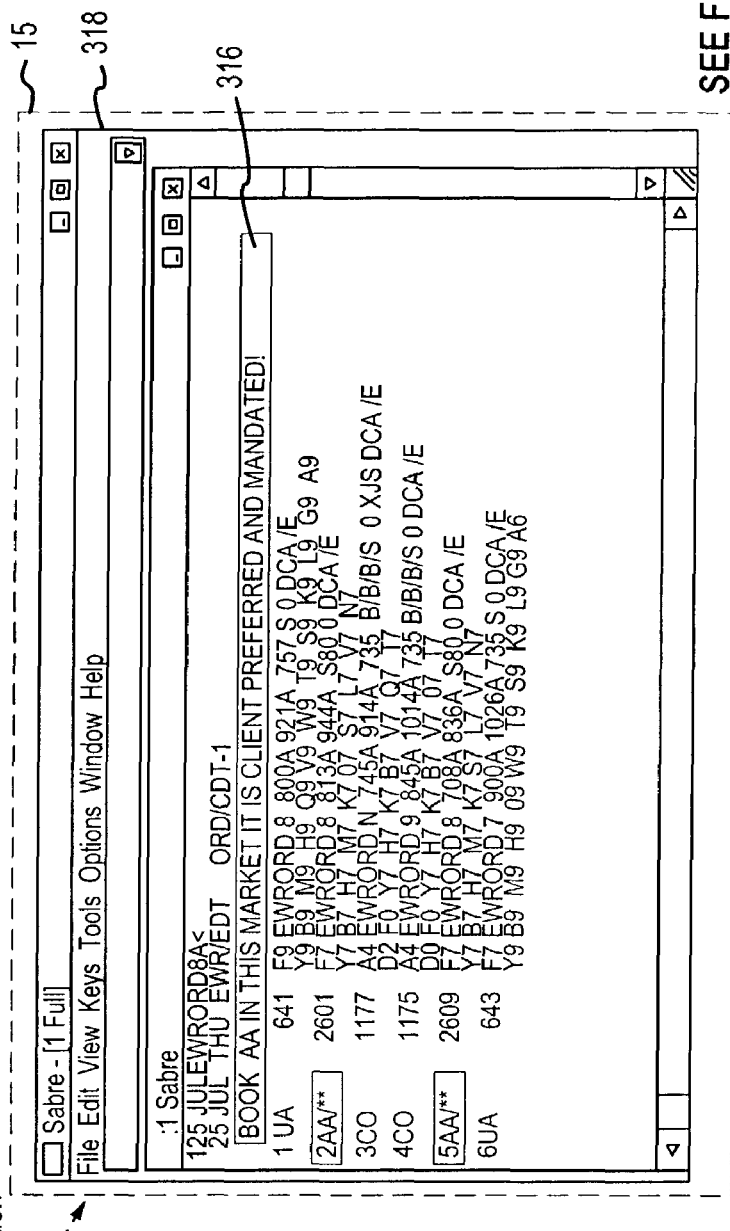
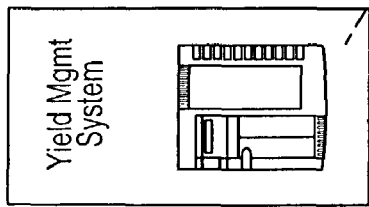
FIG. 5

FROM FIG.5

```
□ Sabre - [1 Full]
File  Edit  View  Keys  Tools  Options  Window  Help
.:1 Sabre
125JULEWRORD8A<
25 JUL THU EWR/EDT    ORD/CDT-1
BOOK AA IN THIS MARKET IT IS CLIENT PREFERRED AND MANDATED!
1 UA    641   F9 EWRORD8  800A 921A 757 S 0 DCA /E
              Y9 B9 M9 H9 Q9 V9  W9 T9 S9 K9 L9 G9 A9
2AA/**  2601  F7 EWRORD8  813A 944A S80 0 DCA /E
              Y7 B7 H7 M7 K7 Q7  S7 L7 V7 N7
3CO     1177  A4 EWRORD.N 745A 914A 735  B/B/B/S 0 XJS DCA /E
              D2 F0 Y7 H7 K7 B7  V7 Q7 07
4CO     1175  A4 EWRORD.9 845A 1014A 735 B/B/B/S 0 DCA /E
              D0 F0 Y7 H7 K7 B7  V7 07 17
5AA/**  2609  F7 EWRORD.8 708A 836A S80 0 DCA /E
              F7 B7 H7 M7 K7 S7  L7 V7 N7
6UA     643   F7 EWRORD.7 900A 09 W9  T9 S9 K9 L9 G9 A6
```
~318

Booking activity is captured and compared to contractual commitments booking ~575

Yield Mgmt System report generated ~320

607 data captured

| Carrier | Market | Result | Pass | Fail | Target % | Actual % | Total Segs | Target Segs | Actual Segs |
|---|---|---|---|---|---|---|---|---|---|
| AA | EWR-ORD | Pass | 1 | | 35% | 36% | 620 | 217.0 | 223 |
| UA | EWR-ORD | Fail | | 1 | 40% | 12% | 425 | 170.0 | 51 |
| CO | EWR-ORD | Fail | | 1 | 25% | 9% | 516 | 129.0 | 46 |
| CO | IAH-ORD | Fail | | 1 | 30% | 12% | 628 | 98.4 | 39 |
| UA | IAH-ORD | Fail | | 1 | 45% | 15% | 481 | 216.5 | 72 |
| AA | IAH-ORD | Fail | | 1 | 25% | 22% | 516 | 129.0 | 114 |
| UA | ATL-DEN | Fail | | 1 | 60% | 23% | 339 | 203.4 | 78 |
| DL | ATL-DEN | Pass | 1 | | 40% | 51% | 418 | 167.2 | 213 |

25-Jul

~322

SEE FIG.7

FIG.6

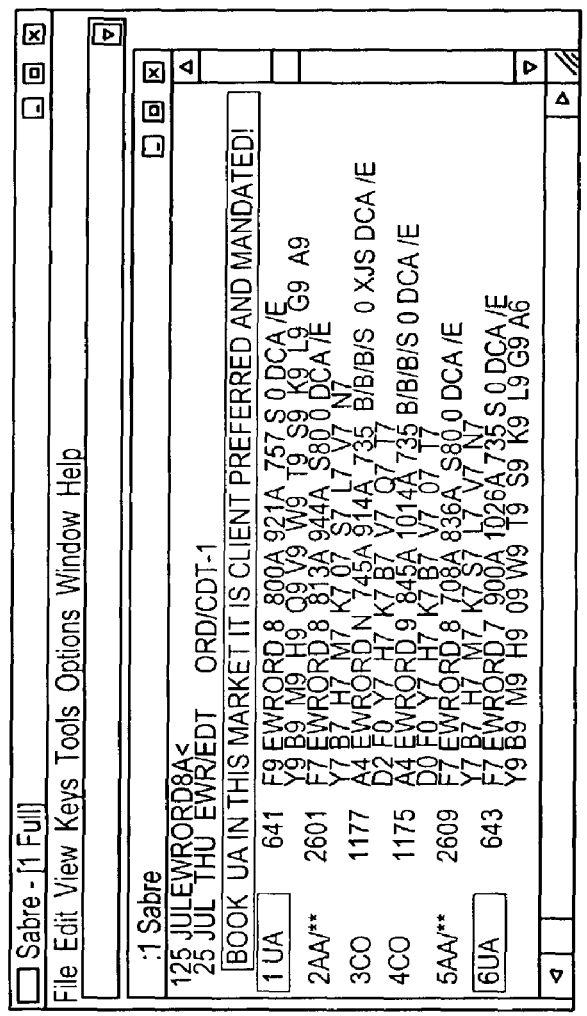
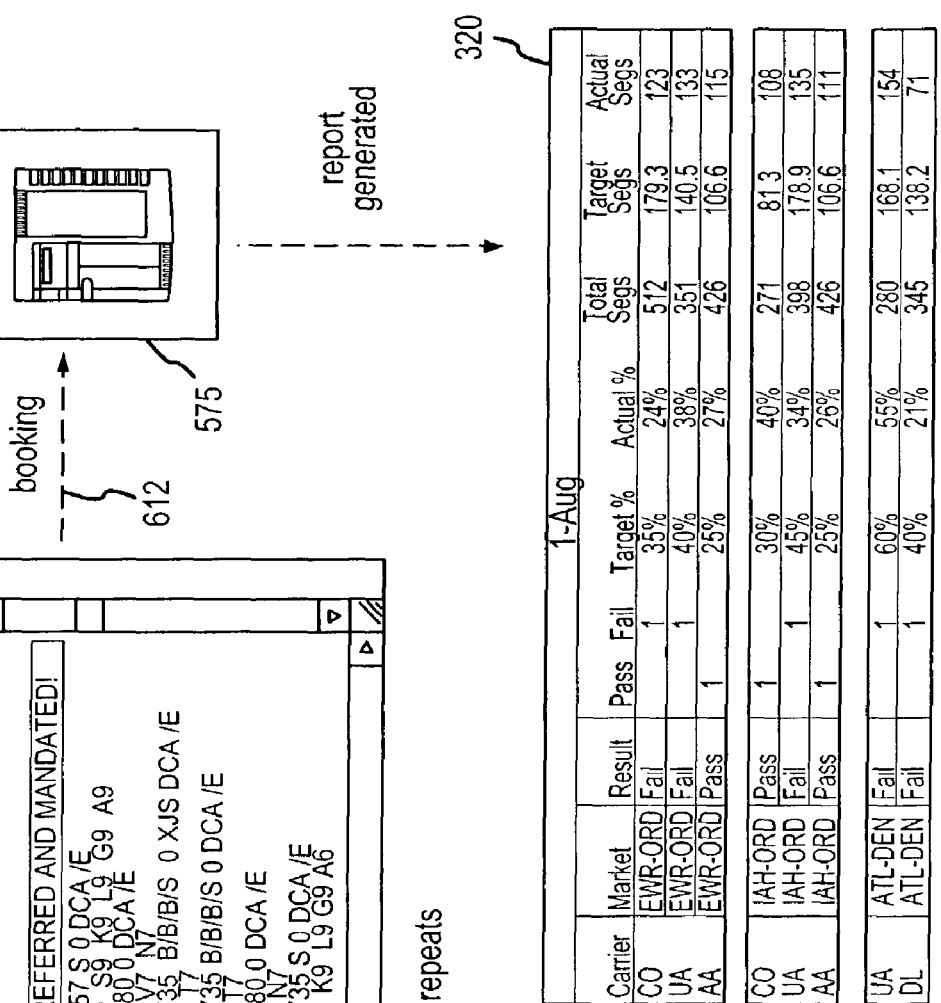
Booking activity is monitored and the cycle repeats
data captured
FIG. 8

SYSTEM AND METHOD FOR AIRLINE PURCHASING PROGRAM MANAGEMENT

RELATED APPLICATIONS

The present application claims the benefit of, and priority to, U.S. Provisional Application No. 60/302,639 filed Jul. 2, 2001 and U.S. Provisional Application No. 60/306,125 filed Jul. 17, 2001; the entire contents of which are hereby incorporated by reference.

FIELD OF INVENTION

The invention relates, generally, to a system and method for analyzing, negotiating, implementing and executing airline contracts and purchases. More specifically, the invention relates to (i) a contract optimization system configured to analyze a corporation's contracts for travel services to calculate optimum contract terms and conditions; and (ii) a contract compliance system configured to ensure that these contractual commitments are met.

BACKGROUND OF THE INVENTION

A large corporation with offices and employees located throughout the world, has a significant need for travel services and large companies and organizations typically purchase a significant amount of travel services from a number of different airlines (or airlines). On any given day, a large company may have hundreds or even thousands of employees traveling from one location to another. Although these employees may travel throughout the world, significant travel also takes place between office locations such as the headquarters, manufacturing plants, distribution centers, and/or the like.

Because of the high volume and frequency of travel, large companies are often able to negotiate special rates and discounts with the airlines. In this regard, it is common for large companies to enter into travel contracts with several airlines. However, unless properly negotiated and drafted, these contracts may not always save the company money. Although a particular contract with a particular airline may provide a negotiated savings for travel between certain times, to certain locations, the inconvenience and contractual obligations may result in a decreased savings over time because of, for example, employees missing flights with the negotiated airline and purchasing last minute flights on non-contract airlines.

Corporate contracts have evolved over the last several years as an advanced form of a "frequent flyer program" aimed at increasing corporate, rather than individual, loyalty. For example, airlines may offer monetary savings on standard published fares in return for the corporation's loyalty and "preferred airline" status. Moreover, a corporation may have a complex portfolio of contracts in place. Corporate contracts may have different scales of geographical coverage (depending on the airline and the size of the corporation), varying degrees of route complexity and a stipulated method of tracking the performance of the contract. For example, large multinational companies with annual air travel expenditures in excess of $15 million may have between three and five corporate airline contracts in place in an attempt to achieve maximum savings.

In general, two exemplary types of corporate contract savings include: (1) rebates and (2) up-front discounts. "Rebates" involve the airline providing a refund in accordance with the amount of business with the airline generated by the corporation. The size of the rebate generally depends upon the "trigger" threshold level achieved by the company. The "trigger" may be represented by price volume, sectors flown, an agreed percentage market share or a number of other factors. "Up-front discounts" generally come in two forms, "net fares" and "agreed percentages." Net fares are typically fixed, discounted fares offered on specific routes in a specified class of service (e.g., Business Class, London Heathrow to New York, JFK). Agreed percentages are typically fixed percentage discounts on a particular group of fares (e.g., 25% discount on all fares in Business Class from the United States to the UK).

In addition to the discounts on air travel, some airlines offer "soft" benefits aimed at the corporate employee's comfort such as, for example, priority check-in, fast-track security, limousine services, access to lounges/shower facilities, free upgrades/priority seating, and free transfers from airport to city center. Thus, the "soft" benefits may help ensure traveler satisfaction and compliance with the contracts of a preferred airline.

Depending on the specific airline involved, travel contracts also typically stipulate a preferred method of contract tracking, such as, for example, the corporation providing monthly management information on company travel patterns (often provided by the company's travel agent) or by the airline monitoring the contract internally. This tracking of travel contract activity generally utilizes a designated "tour code," a corporation-specific code which appears on all qualifying tickets purchased.

In light of the rebates, discounts, and soft benefits, the principal goal for corporations is usually to get the most travel services for the minimum expenditure. Several factors help to determine the net cost savings to the company. Traditionally, companies have attempted to take into account a variety of conditions to optimize their travel needs to negotiate better cost savings. Examples of some of these devices and methods include (1) U.S. Pat. No. 5,832,453 ("Computer System and Method For Determining A Travel Scheme Minimizing Travel Costs for An Organization") issued on Nov. 3, 1998 and assigned to Rosenbluth, Inc. and (2) U.S. patent application Publication No. US 2001/0034626A1 ("Tool for Analyzing Corporate Airline Bids") published on Oct. 25, 2001; the contents of which are incorporated herein by reference. The '453 patent generally describes a system and process that attempts to determine a travel scheme to minimize travel costs for an organization. More particularly, the '453 patent relates to a linear programming model that takes into account various conditions and constraints in an effort to determine the minimum travel costs for any particular company during any particular period of time. The system and method described in the '453 patent is limited, however, in that the programming algorithm uses a simplified linear programming model (e.g., an objective function analyzing particular sets of travel information constraints) and only a few available input parameters. The system described in the '453 patent is further limited in that once an optimal contract model is determined; there are no provisions for implementation, execution and follow-through using the contract terms. In other words, even though a theoretical optimal calculation may be obtained, in reality, it is the travel counselors who typically verify adherence to the contract provisions and limitations.

A recently filed application, U.S. application Ser. No. 10/127,483 filed on Apr. 22, 2002, entitled "System and Method for Travel Airline Contract Management and Optimization" has resolved many of the foregoing problems by creating a system and method of analysis and optimization that more accurately reflects the complex and real-life variables which are common-place in today's airline industry.

However, there remains the problem of properly implementing and executing these optimized airline contracts so that the corporate corporation realizes the calculated savings. To be a successful corporate travel contract, the contract must be provide "best in class" terms in regards to travel pattern coverage, achieving savings and content, while being well-communicated both internally and externally and complied with by travel counselors and corporate travelers. In other words, although an optimal solution may be calculated that achieves maximum savings, these savings are not realized until the solution is properly implemented and executed by travelers and travel counselors utilizing the preferred airlines at the correct time in the correct market sector. Although various programs have attempted to optimize airline contracting, a need still exists for proper management (i.e., implementation, execution and tracking), so the corporation may realize the calculated savings.

SUMMARY OF THE INVENTION

The present invention is directed to a system and method for analyzing, negotiating and optimizing a corporation's air travel contract portfolio through the use of contract optimization applications; and implementing, executing and measuring contract variables to ensure compliance with contract commitments. Exemplary components of this invention includes a system for contract analysis, optimization and forecasting; as well as a system for facilitating compliance with contract terms and conditions at the point of sale.

An exemplary embodiment of the present invention includes a yield management system and method. In this embodiment, after contract optimization, the contract terms and parameters are communicated to a yield management system that is configured to track contract compliance. The yield management system is configured to communicate with a travel booking system (e.g., travel agents, online reservations, etc.). Based on the contract's terms and conditions, and ongoing reservation events; selling instructions are generated by the yield management system and provided to the booking system to determine which airlines should be booked for travel between the various city pairs. When the traveler (e.g., corporation's employee) engages the booking system for travel arrangements, the booking system presents the corporate traveler with the available options. When the traveler books a particular airline reservation, this information is then communicated to the yield management system such that the database is updated and selling instructions are revised accordingly.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views, and:

FIGS. 4-8 are exemplary schematics and screen shots of the present invention.

Other aspects and features of the present invention will be more fully apparent from the detailed description that follows.

DETAILED DESCRIPTION OF EXEMPLARY EMBODIMENTS

The following descriptions are of exemplary embodiments of the invention, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention.

As discussed in the background section, known analytical or optimization programs are, with varying degrees of effectiveness, capable of calculating optimal contract terms and conditions between airlines and corporations. However, these contracts are not beneficial if, for example, the corporation does not meet the thresholds needed to receive a particular discount. A number of significant factors exist that influence the disconnect between the theoretical results calculated and the actual results achieved. In order to more effectively facilitate contract compliance, the corporation usually needs to achieve a number of pre-determined "trigger" targets or thresholds. The present invention is generally directed to a system and method for managing an airline purchasing program to realize the savings relating to contract optimization.

Figure 1:
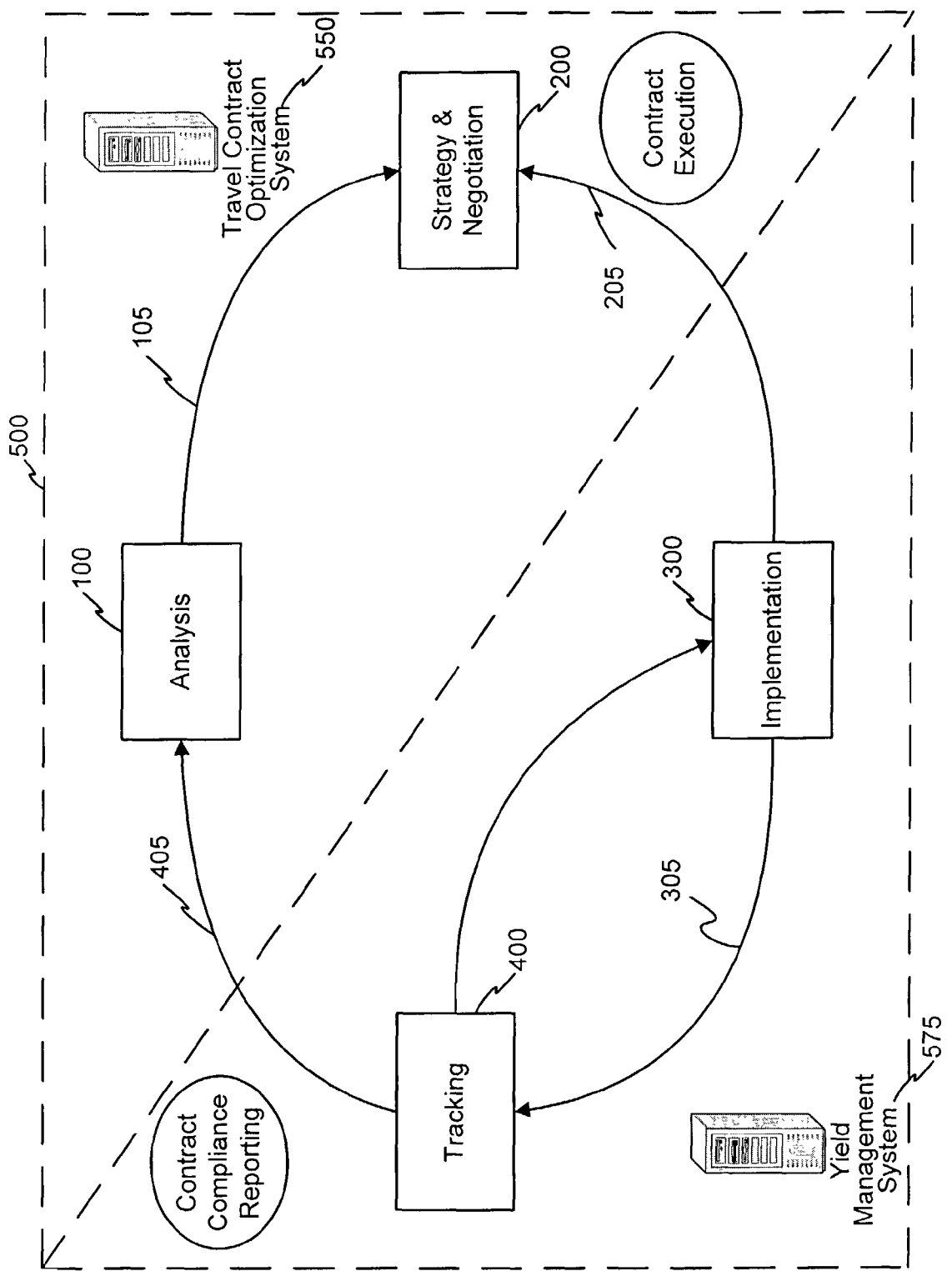
FIG. 1 illustrates an overview of an exemplary travel contract optimization and compliance process of the present invention.

The present invention is a part of a system for assisting corporations with developing and negotiating contracts and ensuring compliance with the contract terms and conditions. Although the present invention is primarily described herein in terms of travel contracts with airlines, this invention is not so limitation. Indeed, this invention may be used in any number of industries (e.g., inventory management, transportation, etc.) involving contract strategizing, optimization, and compliance. As shown in FIG. 1, this system typically involves an Analysis phase 100, a Strategy and Negotiation phase 200, an Implementation phase 300, and a Tracking phase 400. For example, a travel services company such as American Express Travel Services may assist corporations in (i) analyzing existing contract terms to develop optimal terms favorable to the corporation (step 105), (ii) negotiating with airlines on behalf of corporations to enter into favorable contracts (step 205), (iii) implementing the contract to facilitate compliance with the contract terms (step 305); and (iv) tracking corporate employee travel activity to assist the corporation in future contract negotiations (step 405). These phases are facilitated, in part, by a host system 500, which generally comprises a travel contract optimization system 550 and a yield management system 575. Thus, two exemplary aspects of this invention disclosed herein relate to travel contract optimization and contract compliance. The contract compliance system (i.e., yield management system) will be discussed first.

Figure 2:
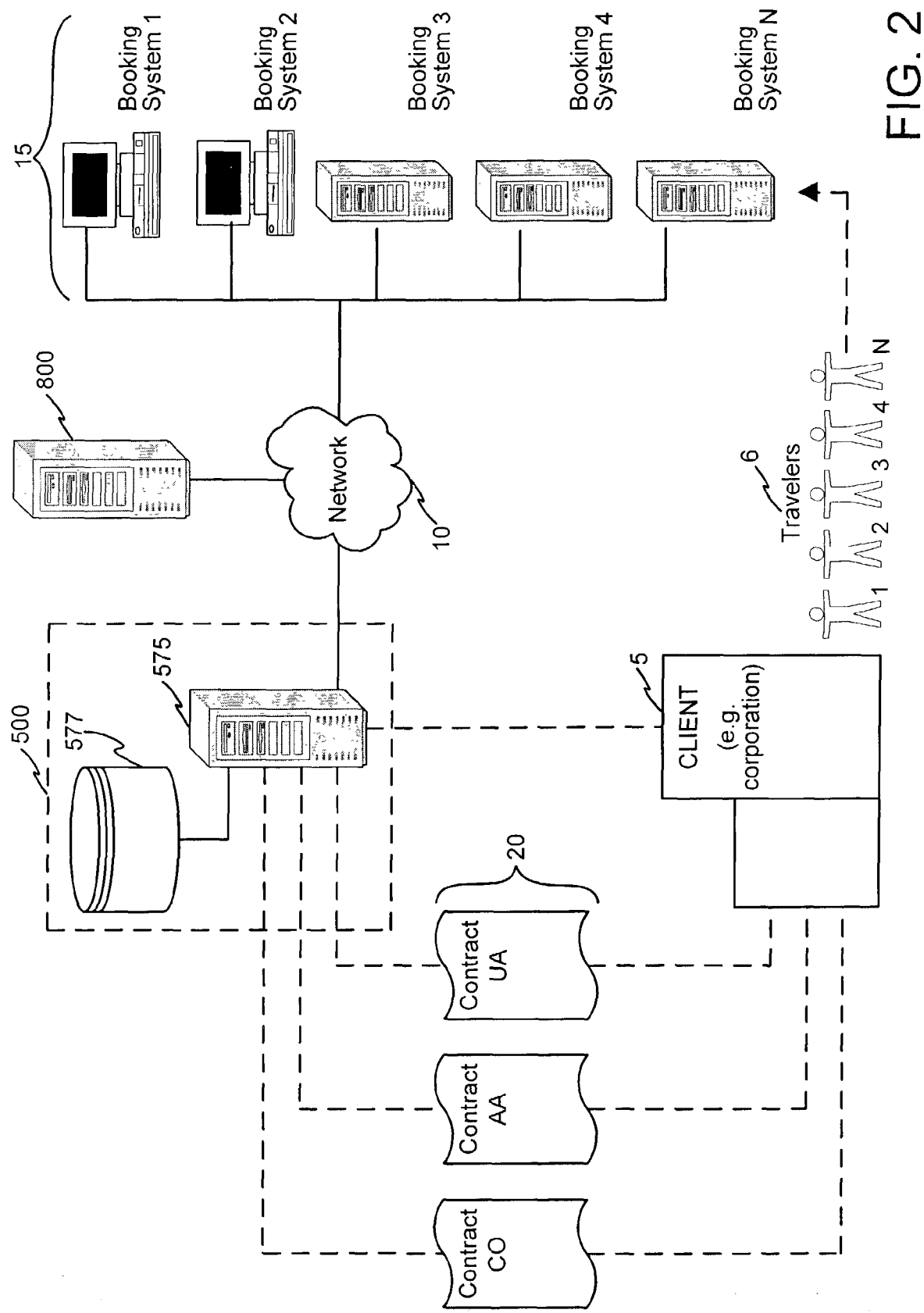
FIG. 2 is a flow chart depicting an exemplary system of the present invention.

Regarding the contract compliance aspect of the present invention, an exemplary embodiment comprises a yield management system 575, which, after the travel contract has been executed, (i) assimilates contract terms and conditions, (ii) generates selling instructions, (iii) communicates selling instructions to a booking system, and (iv) tracks contract compliance. As shown in FIG. 2, the yield management system 575 may be a computer server running one or more database components 577. Further, the yield management system 575 is generally configured to communicate with one or more booking systems 15 via any type of network 10. The booking systems 15 may facilitate online travel reservations, travel agent-assisted reservations or any other type of travel reservation tasks. The yield management system 575 may also be configured to communicate with the corporation 5. As shown in FIG. 2, contract conditions and terms 20 are communicated to the yield management system 575. With regard to the terms and conditions, a contract with a particular airline may provide that the corporation agrees to use that airline for 60% of all travel booked between two locations. If a corporation complies with this contractual obligation, the corporation receives a 10% discount or rebate.

It should be appreciated that the host system 500 of the present invention may be facilitated by any number of entities (e.g., a financial institution, a corporation, a Travel Agency, an airline system, and/or the like). Additionally, the host system 500 of the present invention may exist within a single entity, e.g., the financial institution, or may be distributed between or among several different systems. The host system 500 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including corporation data, contract data, airline data from OAG, financial institution data and/or like data that could be used in association with the present invention. As those skilled in the art will appreciate, a computer system which may be used herein will typically include an operating system (e.g., Windows NT, 95/98/2000/XP, Linux, Solaris, etc.) as well as various conventional support software and drivers typically associated with computers. The system computer can be in a variety of environments with access to a network. In an exemplary embodiment, access is through the Internet or other distributed network (e.g., LAN/WAN) utilizing any web-browser software or other communication package. In another exemplary embodiment, communication between computer systems may be over a dedicated network or shared network.

Although the host system 500 is depicted in FIG. 1 as a contiguous system comprising a travel contract optimization system 550 and a yield management system 575, it should be appreciated that the host system 500 may comprise only a travel contract optimization system 550, only a yield management system 575, or various combinations of these systems. Indeed, FIG. 2 depicts an embodiment of the present invention comprising primarily the yield management system 575, where the yield management system 575 communicates with booking systems to facilitate contract compliance. It should also be appreciated that the travel contract optimization system 550 and the yield management system 575, may indeed be co-located within one system or within one system environment, or may be located or distributed in separated operating environments.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

A database or data set 577 (FIG. 2), such as that which may be used as part of the yield management system 575 or the travel contract optimization system 550, may include any type of database, such as relational, hierarchical, object-oriented, and/or the like. Common database products that may be used to implement the databases include DB2, Microsoft Access, MSSQL, or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host system 500 may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The host system 500, including the yield management system 575, may communicate with other systems (e.g., booking systems 15, corporation 5 systems, GDS systems 800) over any type of network 10, including a distributed network, dedicated network, shared network, LAN, WAN, or any other computerized network capable of facilitating communication of digital data. Communication may be facilitated with any network protocol, such as TCP/IP. It is further contemplated that the present invention may communicate with the GDS system 800 directly, indirectly or not at all. Indeed, an exemplary embodiment of the contract compliance system contemplates no direct communication or integration with the GDS system. In this situation, selling instructions (discussed later) are integrated with GDS information at the point of sale (e.g., booking system 15). In another embodiment, the selling instructions function to filter GDS data prior to reaching the point of sale.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a corporation-side scripting language, such as JavaScript, VBScript or the like.

"Corporation," as used herein, includes any company, organization, individual or other entity which contracts with airlines, directly or indirectly, for travel services. In an exemplary embodiment the corporation is a corporation of the host.

"Airline" includes any business or other entity that provides or facilitates transportation or travel services. Although the present invention refers to an "airline," it should be appreciated that this invention is applicable to other travel airlines (e.g., bus, train) as well. Examples of airlines include: United Airlines (UA), American Airlines (AA), etc.

Exemplary definitions of other industry terms and phrases are now set forth. A travel "segment," for example, includes a particular airline (or other airline) route between cities. For example, a flight originating in Phoenix (PHX), which stops in Dallas (DFW), in route to Baltimore (BWI) comprises two segments: namely, (1) PHX-DFW, and (2) DFW-BWI. Segments may be further characterized as "actual segments" and "potential segments," where an actual segment includes the number of flown segments in a sector market for the specified time period and a potential segment is the projection of the number of segments that can be placed on any one airline based on that airline's strength of schedule in corresponding markets. "Segment share" is the proportion of segments currently placed on a selected airline as compared to total segments.

The term "available market share" (AMS) is the fair market share that an airline possesses based on its strength of schedule in the market. The term "current market share" (CMS) is the proportion of expenditures currently placed on a selected airline as compared to the total expenditures for a city pair.

The phrase "class of service" may also be used in the calculation of an optimal travel solution. "Class of service" includes the various types of service offered by the variety of airlines (e.g., first class, business class, coach class), which may be divided further by full and discounted fares. An "airport pair" or "city pair" includes the location of two airports that define, for example, the point of origin and destination. City Pairs are origin and destination related. For example, a flight from Newark to Los Angeles through Phoenix would be considered Newark to Los Angeles for our purposes. In an exemplary embodiment, the airlines are not necessarily interested in the connection point but the entry and departure points. For example, the segment PHX-BWI is an airport pair, where Phoenix is the origin and Baltimore-Washington International is the destination. "Corporation expenditure," or simply "expenditure," includes the amount of money spent by a particular corporation for particular travel services. In other words, "expenditure" is the historical revenue placed on an airline or in a market for the specified time frame. The "actual expenditures" may be net of discount if they were incurred on a preferred airline providing a front-end contractual discount. "Expenditure potential" is a projection of the expenditures that can be allocated to an airline based on that airline's strength of schedule in corresponding markets. The term "gap" is used to describe the difference in the actual and potential expenditures or segments. "Exclusive markets expenditure" is revenue in markets where there is only one viable airline, in most cases, the airline with only non-stop service. This is also referred to as a monopoly market.

"Overlap" is the amount of potential revenue in a market that is shared between two or more airlines. "Price per segment" is the price per segment flown on a specific airline. "Rank" is the order, based on actual expenditures, of the city pair in question compared to all other identified city pairs. "Coverage" is an estimate of the percentage of a corporation's total expenditure that can be serviced by an airline's potential in corresponding markets and "coverage net of overlap" is the percentage of total revenue that is serviced by an airline combination net of overlap in competing markets. "Expenditure share" is the percentage of airline expenditure that is placed on any given airline and "utilization" is the proportion of expenditures currently placed on an airline compared to the airline's potential to service expenditure.

The term "Discount" is used to define the percentage discount that is available to a contracting corporation. "Revenue" is the amount of expenditure that achieves specified contractual criteria. "Gross Revenue" is the amount of "revenue" that represents the expenditure with no discount (e.g., revenue/(1−discount percentage)). "Discount Revenue" is the difference between gross revenue and revenue. "Effective Discount" is the weighted average discount that a contract provides (e.g., discounted revenue/gross revenue). "Fare Class" is the class the class of airline inventory from which the ticket was booked.

"Discounts" may come in many varieties. For example, "hub city discounts" are discounts that are applicable to flights into or out of a specific city (Newark); "city pair discounts" are discounts that are applicable to flights into or out of a specific city pair (Newark-Los Angeles); "fare class discounts" are discounts that apply to a specific class of airline inventory; Y, B, H class; "overall discounts" are discounts that cover all spend regardless of city pair, fare class, hub city, etc.

Turning now to a detailed description of an exemplary embodiment of a contract compliance system and method, as depicted in FIGS. 2-8. A corporation 5, as shown in FIG. 2, negotiates contracts with various airlines. The terms and conditions from these contracts (e.g., airline, airport pair, target %, etc.) are assimilated into a yield management system 575, where selling instructions are generated according to the respective terms and conditions. If, for example, a company agrees to place 60% of its travel between city A and city B with UA, the selling instructions will be formed so as to achieve compliance with this commitment. These selling instructions are then communicated, via network 10, to the various booking systems 15. In an exemplary embodiment, when the corporate traveler 6 makes travel reservations, the selling instructions recommend or mandate to the travel counselor that the corporate traveler 6 be placed on a particular airline. In another embodiment, a particular flight may be recommended or mandated. After the travel reservation is "booked," the booking activity is communicated back to the system 575 to update contract compliance data and generate reports. These reports often facilitate the corporation's future efforts in negotiating and developing travel contracts with the airlines. FIGS. 3-8 depict a more detailed description of an exemplary embodiment of the present invention.

Figure 3:
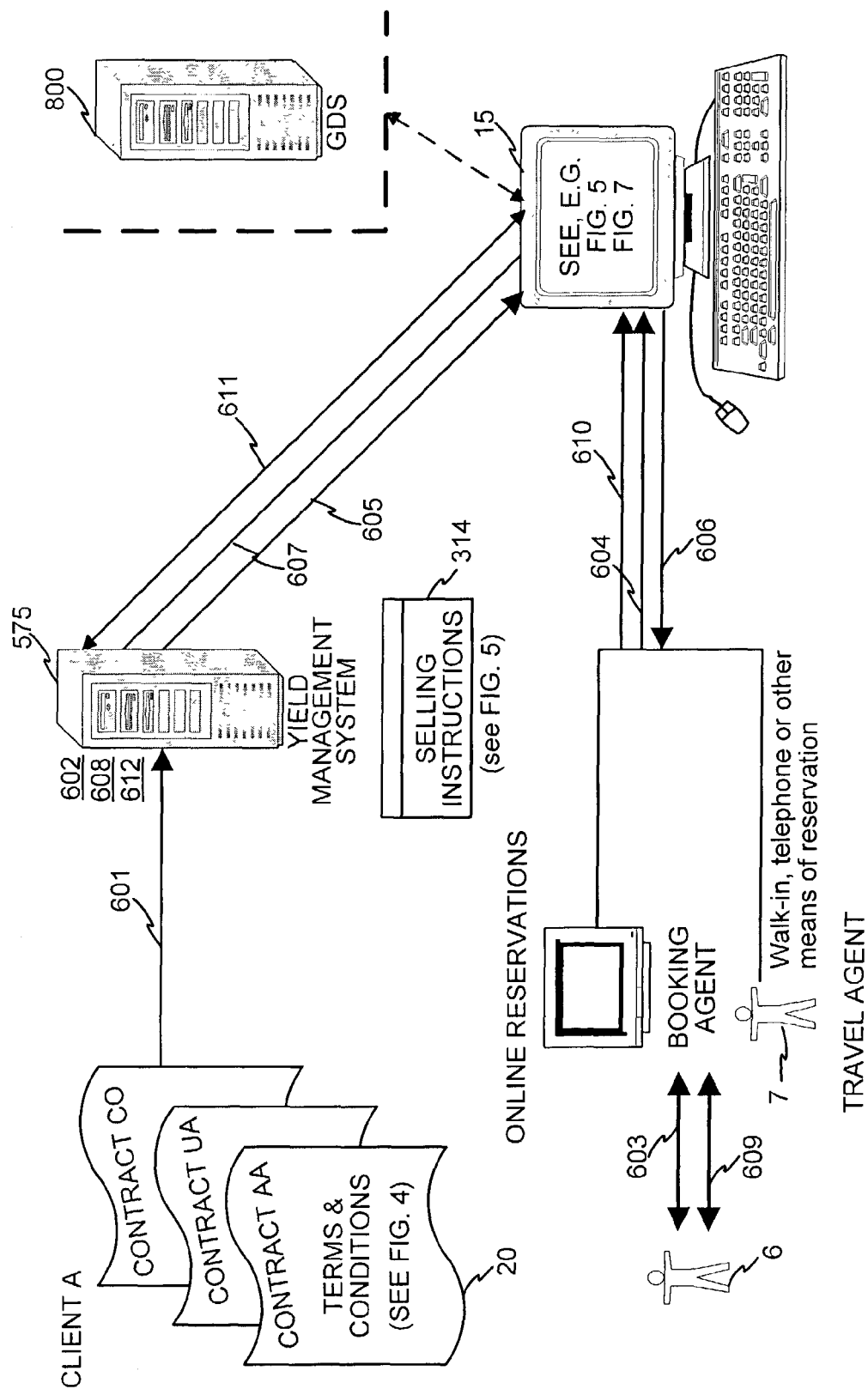
FIG. 3 is a block diagram and process flow of an exemplary system for facilitating contract compliance.

As shown in FIG. 3, the terms and conditions from one or more airline contracts 20 are communicated to a yield management system 575 (step 601). As previously noted, large companies typically have several contracts with several different airlines. A control sheet 301 listing exemplary terms and conditions 302 of the airline contracts is depicted in FIG. 4, where variables such as airline airline 304, originating city 306, destination city 308, target share percentage 310, booking priority 312 and a message display 314 are automatically and/or manually communicated to a yield management system 575. The yield management system 375 generates selling instructions 314 (FIG. 5) according to the various contract terms and conditions (FIG. 3, step 602). These selling instructions are derived utilizing contract compliance software that is programmed to compare contract terms and conditions from usually two or more contracts with the travel reservation booking activity to determine the extent to which the contract terms are being complied with. If a certain airline is not being sufficiently utilized so as to comply with contract terms, the selling instructions will reflect that more travel should be booked with that given airline. When making travel reservations, a corporate traveler 6 generally engages a booking system 15, though a booking agent which, for example, may be either an online system 8 or a travel counselor 7, to reserve a flight between a particular city pair (e.g., EWR and ORD) (FIG. 3, step 603). The travel counselor 7 or online system 8 communicates with a booking system 15 (FIG. 3, step 604), wherein the booking system 15 receives for the selected city pair and/or date/time: (i) information from a global distribution system (GDS) 800, such as provided by the SABRE® company, pertaining to the available airlines serving the city pair; and (ii) the selling instructions from the yield management system 575 (FIG. 3, Step 605).

As shown in FIG. 5, the yield management system 575 communicates with the booking system 15, providing selling instructions 314 that reflect the airline availability between the city pair and/or the contract status of the airlines serving the city pair. An exemplary booking system 15 computer display 318 shows how an exemplary message appears to the travel counselor 7, or to the corporate traveler 6 during an online reservation. As shown, if the contract threshold has not been reached with a high-priority airline, the message displayed will indicate to the travel counselor 7 that a particular airline is a high priority, and, in some instances, may mandate the selection of that particular airline. In the message 316 shown in FIG. 5, the travel counselor 7 is informed to: "Book AA in this Market it is corporation preferred and mandated." As shown in FIG. 5, the corporation 5 has contracts with three airlines involving the selected EWR-ORD city pair. According to the terms and conditions of these exemplary contracts, to help maximize contracted cost savings, AA needs to achieve a 35 percent target share; UA needs to achieve 40 percent; and CO needs to achieve 25 percent. Based on the calculated degree of compliance with the terms and conditions of the contracts with the three airline contracts, these airlines are then given a priority status, e.g., between EWR-ORD, AA is first priority, UA is second priority and CO is third priority. Notations are made, for example, indicating that reserving on AA is mandated for that particular transaction. Surpassing the target share with any one airline, while not achieving the target share for another airline may result in lost potential savings.

Returning to the flow diagram of FIG. 3, the booking agent books the traveler 6 on the mandated (or preferred) airline (FIG. 3, step 606). The booking system 15 communicates this booking activity (e.g., purchase 1 ticket EWR-ORD on AA) to the yield management system 575 and the booking activity is captured and is again compared to the contractual commitments (FIG. 3, step 607).

Figure 7:
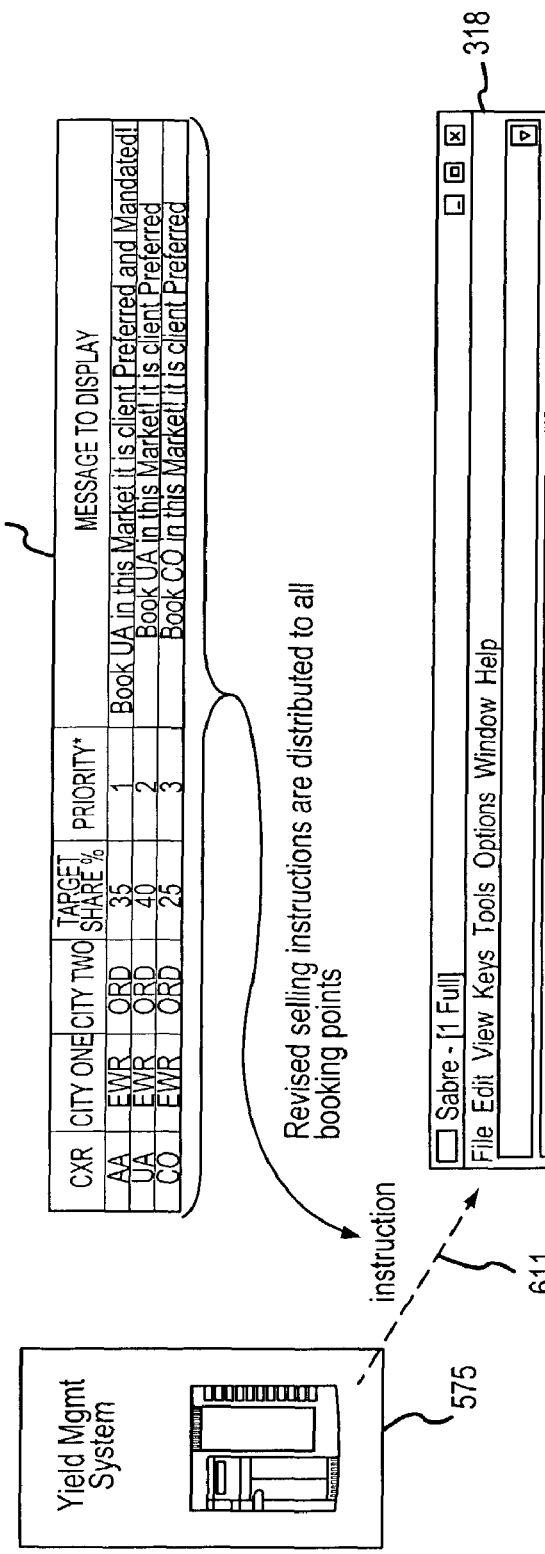

Based on this updated booking information, the contract compliance data is updated and the selling instructions are revised (FIG. 3, step 608). The yield management system 575 report 320 (FIG. 6) reflects the revised contract compliance information. As shown in report 320 (FIG. 6), for the contract with AA the target percentage in the EWR-ORD city pair market is 35% and the actual percentage achieved at the time of the report is 36%, therefore, the corporation 5 has, at the time of the report, achieved the target percentage. However, the target percentages for the UA and CO contracts, respectively 40% and 35%, have not been achieved. Thus, the selling instructions will be reflect an emphasis on selling UA and CO tickets in that particular market. As shown in FIG. 3, when another traveler 6 desires to make travel reservations (FIG. 3, step 609), the booking system 15 is then accessed (FIG. 3, step 610) and revised instructions are received from the yield management system 575 (FIG. 3, step 611). As before, when the reservation is made, the booking activity is sent back to the yield management system 575 and the selling instructions 314 are again updated (FIG. 3, step 612). This procedure is repeated throughout the duration of the contract to facilitate contract compliance and to optimize the total cost savings. FIGS. 7 and 8 show an additional exemplary iteration of the process, where a revised selling instruction message 322 is communicated to the booking system 15 (step 611) and displayed on the screen display 318. The booking activity is again returned to the yield management system 575 (step 612) and the process again repeats.

Turning now to another aspect of the present invention relating to travel contract optimization.

An exemplary embodiment of the travel contract optimization system 550 and method optimization involves the determination of each airlines potential to service a corporations flown city pairs. As a brief background, a travel information provider (TIP), such as OAG® travel information services, is an entity that provides a variety of travel information (flight schedules, seat configuration information, etc.) to a variety of customers (travel agencies, airlines, corporations, etc.). With respect to an exemplary embodiment of the travel contract optimization system, the TIP periodically (e.g., monthly) provides a data file to the travel contract optimization system 550 (FIG. 1), which comprises a variety of information, such as the number of flights, number of seats, time of day and aircraft type by airline for every city pair routing point worldwide.

TIP flight and seat data is consolidated is utilized to facilitate a weighting formula that establishes airline market share based on variables such as number of seats, number of flights, equipments type, and time of departures. Two tables are generated to depict airline potential for the corporation: "aggressive potential" and "non-aggressive potential." In a non-aggressive potential table, airline seats and flights for comparable service (e.g., only non-stops versus non-stops when applicable) are compared. With regard to the aggressive potential table, the airline seats and flights for all service (e.g., non-stops, directs and connections) are compared with a higher weighting factor given to non-stops.

Next, historic and potential corporation data is generated. Corporation travel data is retrieved in an exemplary embodiment for a specified timeframe in a bi-directional format (e.g., Phoenix-Houston and Houston-Phoenix are the same city pair) inclusive of expenditure, segments flown and fare basis code. Corporation travel data is then matched to the table (see tables) to determine the potential expenditure by airline (both aggressive and non-aggressive). This data is then used to drive a platform for the travel contract optimization system 550. An example of aggressive and non-aggressive potential is provided at Table 1 below.

TABLE 1

| Market | Non-Stop Service | Connection Service | Non-Aggressive | Aggressive |
|---|---|---|---|---|
| Chicago-Orange County | UA-5, AA-5 | DL-20, HP-15, NW-10 | UA-50%, AA-50%, DL-0%, HP-0%, NW-0% | UA-33%, AA-33%, DL-15%, HP-11%, NW-7% |

Regarding non-aggressive potential, when applicable, only non-stop service is compared. For example, as shown above in Table 1, assuming that airlines UA and AA flew the route with non-stop service and similar seats and scheduled departure times, the share would be 50-50% and 0% for DL, HP, NW (which have no non-stop service). Based on the bracketing methodology both UA and AA would receive 100% of the potential expenditures.

Regarding aggressive potential, all service is compared. In this case UA, AA, DL, HP and NW would each receive some potential. UA and AA would still receive the most significant potential due to weighting factors that give preference to non-stop flights and seats. Various other weighting factors may nevertheless be utilized depending on corporation preferences and contract terms and conditions. Thus, as shown in Table 1, UA and AA may receive an increased weighting in this instance because of a general preference for non-stop service.

An exemplary embodiment of the travel contract optimization system 550 and method comprises (i) an expenditure module comprising an overview screen, an airline combination screen, a city pairs screen, and an actual market share breakdown; (ii) a shift module comprising a shift screen; and (iii) a savings module comprising a savings screen.

An expenditure module is an exemplary component of the travel contract optimization system 550, comprising an overview screen, an airline combination screen, city pairs screen, and a breakdown of actual market share. With regard to the overview screen, historic expenditure is compared to potential expenditure. In an exemplary expenditure module, corporation expenditures are derived by considering the airlines with the most potential to service expenditure. If, for example, as shown in Table 2, for the full year of 2001 company A had had $10.0M in expenditure of which $2.0M was on UA, the result of this analysis indicates that UA could handle as much as $4.0M of company A's expenditure. The expenditure potential is the sum of the airline potential expenditures in each city pair for all flown markets.

TABLE 2

| Airline | Expenditure | Share | Expenditure Potential* | Utilization | Coverage | Exclusive Markets |
|---|---|---|---|---|---|---|
| UA | $2.0 M | 20% | $4.0 M | 50% | 40% | $550K |

With regard to the airline combinations analysis, any number of airlines may be compared. As shown in Table 3, for example, the UA/AA/NW combination has the potential to service $10M in expenditure, of which $2.5M is in competing markets. As a result, the potential net of overlap is $7.5M ($10M–$2.5M). Assuming that the corporation had $10M in total expenditure, the Coverage Net of Overlap would be 75% ($7.5M/$10.0M).

TABLE 3

| Airline | Expenditure | Expenditure Potential | Combinations | Overlap | Potential Net of Overlap |
|---|---|---|---|---|---|
| UA | $2.0 M | $4.0 M | UA/AA | $1.5 M | $2.5 M |
| AA | $1.5 M | $4.0 M | UA/NW | $0.5 M | $3.5 M |
| NW | $1.0 M | $2.0 M | NW/AA | $0.5 M | $1.5 M |
| Total | $4.5 M | $10.0 M | Total | $2.5 M | $7.5 M |

A comparison of actual and potential expenditures for the airlines with the greatest potential to service expenditure is also contemplated by the travel contract optimization system; where the airlines are ranked by city pair spend. In addition, the actual market share breaks down the price per segment for the airline in questions, with the ability to compare fares paid on other airlines in the city pair.

An exemplary travel contract optimization system 550, further comprises a shift module that analyzes the amount of potential spend that can be placed on each airline within an airline combination. As shown below in Tables 4a-b, the amount of expenditure that can be shifted to an airline is dependant on one or more variables (e.g., policy and placement within strategy). The methodology of the shift module is to move as much expenditure to the primary airline before moving to the second priority airline, third priority airline, etc. Examples of two shift strategies are shown below, one with a non-aggressive potential and the other an aggressive potential.

TABLE 4a

| Strategy Rank | Airline | Current | Potential | Potential Within Strategy |
|---|---|---|---|---|
| Primary | AA | $1.5 M | $4.0 M | $4.0 M |
| Secondary | CO | $2.0 M | $3.0 M | $2.2 M |
| Tertiary | US | $1.0 M | $3.0 M | $0.5 M |
| Fourth | NW | $1.0 M | $2.0 M | $0.5 M |

Strategy#2: NW, AA, CO, US

TABLE 4b

| Strategy Rank | Airline | Current | Potential | Potential Within Strategy |
|---|---|---|---|---|
| Primary | NW | $1.0 M | $2.0 M | $2.0 M |
| Secondary | AA | $1.5 M | $4.0 M | $3.1 M |
| Tertiary | CO | $1.0 M | $3.0 M | $0.7 M |
| Fourth | US | $1.0 M | $2.0 M | $0.4 M |

The present travel contract optimization system 550 and method further contemplates a savings module that allows the user to input airline contract parameters to compare the effective contract discount and savings levels, such as hub city discounts, city pair discounts, fare class discounts, overall discounts, and the like. An example of the savings methodology is shown below in Table 5.

TABLE 5

| Co.A Contract on UA | Applicable Fare Class | Discount | Revenue | Gross Revenue | Discount Revenue |
|---|---|---|---|---|---|
| Chicago-Dallas | F, Y, B | 25% | $1.1 M | $1.5 M | $0.4 M |
| Chicago-Newark | F, Y, B | 25% | $0.9 M | $1.2 M | $0.3 M |
| Chicago-Los Angeles | F, Y, B | 25% | $3.5 M | $4.7 M | $1.2 M |
| System | All excluding K, L | 15% | $15.9 M | $18.7 M | $5.3 M |
| System | K, L | 5% | $1.0 M | $1.5 M | $0.3 M |
| Total | | | $22.4 M | $27.1 M Effective Discount | $4.7 M 17% |

Figure 9:
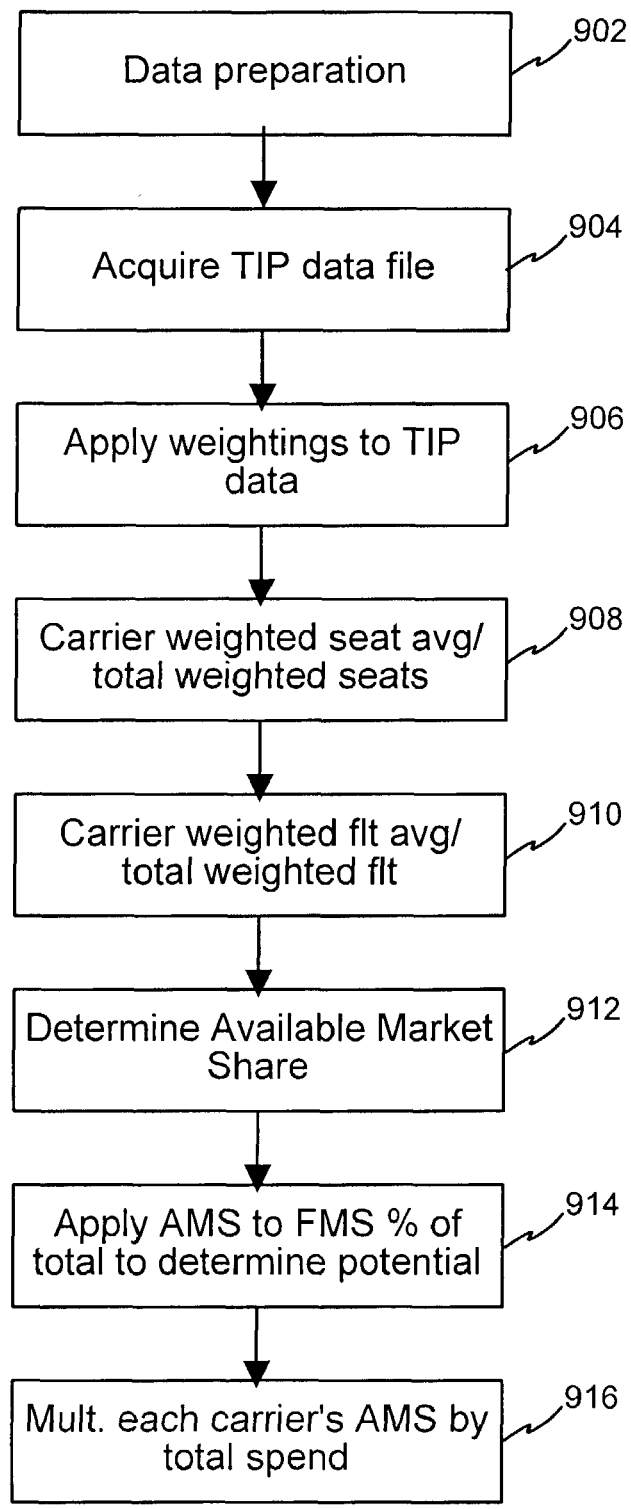
FIG. 9 is a flowchart of an exemplary travel contract optimization process.

The following method shown in FIG. 9 depicts an aggressive policy "actual and potential" model, where data is first "cleaned" by eliminating code shares, dropped cities, blank airlines, etc. (step 902). TIP flight schedule and seat configuration file is retrieved (e.g., airline flights, number of seats, time of day and equipment type by market) (step 904). Weightings are applied to the raw TIP data (step 906), for example Table 6 depicts an exemplary weighting, although it should be appreciated that weighting may be adjusted according to corporation needs and demands.

TABLE 6 weightings applied to raw TIP data:

| Non-stops | Directs | Connections |
|---|---|---|
| prime-time 10 | prime-time 1.25 | prime-time 1.1 |
| non prime-time 8 | non prime-time 1 | non prime-time 1 |

Next, airline specific weighted seats are divided by the total weighted seats in the market (step 908). Likewise, the airline specific weighted flights are then divided by the total weighted flights in the market (step 910). The average of an airlines weighted seat share and weighted flight share is determined (step 912), which shows each airline's TIP Available Market Share (AMS) in each market. The TIP AMS is applied to an exemplary bracket (Table 7) to determine potential (step 914).

TABLE 7

| Falls between | Then airline receives |
|---|---|
| .001%-9.99% | TIP FMS % of total |
| 10%-14.99% | 25% of total in market |
| 15%-19.99% | 75% of total in market |
| 20%-29.99% | 75% of total in market |
| 30% and above | 100% of total in market |

After the "potential" is determined, each airlines bracketed AMS is multiplied by the total spend in the market (step 916).

With regard to the non-aggressive policy actual and potential model, the processes are similar to that described above with respect to the aggressive model, with the exception that both the non-stop and connection service is compared to determine airline AMS.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical contract optimization or contract compliance system.

We claim:

1. A contract management method implemented by a travel procurement system having a yield management system and a processor, comprising:

storing contract data and contract compliance data in said yield management system;

querying, via said processor, for contract data from said yield management system, wherein said contract data includes at least one of a discount amount based on a yield agreement and a monthly travel spend quota, and wherein said contract compliance data comprises a comparison of said contract data and a fulfilled booking request;

generating first selling instructions in accordance with said contract data and said contract compliance data, wherein said first selling instructions include a designation of a first travel provider based on priority status of said first travel provider and at least one of an aggressive potential and a non-aggressive potential, wherein said non-aggressive potential comprises a listing of comparable travel services and said aggressive potential comprises non-comparable travel services and a weighting factor;

acquiring, via said processor, said first selling instructions from said yield management system based on said contract data;

communicating, via said network, said first selling instructions to a booking system via said yield management system;

receiving said fulfilled booking request, via said network, from a booking system, wherein said fulfilled booking request conforms to said first selling instructions and designates a reservations provider for said fulfilled booking request based on said first selling instruction;

updating, via said processor, said contract compliance data of said yield management system with said booking request to produce updated contract compliance data, wherein said booking request includes said first travel provider corresponding to said yield agreement;

retrieving, via said processor, said updated contract compliance data from said yield management system;

comparing, via said processor, said updated contract compliance data to said contract data to identify compliance with said contract data, wherein identifying includes identification of a first monthly travel spend quota associated with said first travel provider;

transmitting, via said network, said comparison to said yield management system;

transforming, via said yield management system, said first selling instructions into second selling instructions based upon said comparison wherein said second selling instructions are configured to fulfill a second monthly travel spend quota with a second travel provider;

storing said second selling instructions in said yield management system;

communicating, using said network and said yield management system, said second selling instructions to said booking system; and verifying, by said yield management system, that said second selling instructions are fulfilled without modification so that said second monthly travel spend quota is at least partially achieved.

2. The method of claim 1, wherein said reservations are airline travel reservations.

3. The method of claim 1, further comprising determining, via said processor, said contract data to be used in said acquiring step.

4. The method of claim 1, wherein said contract data are derived from terms and conditions of contracts between corporations and airlines and include a name of airline, target percentage, destination city and origination city.

5. The method of claim 1, wherein said booking system facilitates reservations automatically in accordance with said second selling instructions.

6. The method of claim 2, wherein said booking activity comprises a number of seats reserved on a particular airline between a particular city pair.

7. The method of claim 6, further comprising receiving airline information from said first travel provider via said network.

8. The method of claim 1, wherein said booking system facilitates online reservations.

9. The method of claim 1, wherein said booking system facilitates automated telephone reservation.

10. The method of claim 1, wherein said booking system facilitates in-person airline reservations.

11. An article of manufacture including a computer readable medium having non-transitory instructions stored thereon that, in response to execution by a computing device, cause said computing device to perform operations comprising:

storing contract data and contract compliance data in said yield management system;

querying for contract data from said yield management system, wherein said contract data includes at least one of a discount amount based on a yield agreement and a monthly travel spend quota, and wherein said contract compliance data comprises a comparison of said contract data and a fulfilled booking request;

generating first selling instructions in accordance with said contract data and said contract compliance data, wherein said first selling instructions include a designation of a first travel provider based on priority status of said first travel provider and at least one of an aggressive potential and a non-aggressive potential, wherein said non-aggressive potential comprises a listing of comparable travel services and said aggressive potential comprises non-comparable travel services and a weighting factor;

acquiring said first selling instructions from said yield management system based on said contract data;

communicating said first selling instructions to a booking system via said yield management system;

receiving said fulfilled booking request, via said network, from said a booking system, wherein said fulfilled booking request conforms to said first selling instructions and designates a reservations provider for said fulfilled booking request based on said first selling instruction;

updating said contract compliance data of said yield management system with said booking request to produce updated contract compliance data, wherein said booking request includes said first travel provider corresponding to said yield agreement;

retrieving said updated contract compliance data from said yield management system;

comparing said updated contract compliance data to said contract data to identify compliance with said contract data, wherein identifying includes identification of a first monthly travel spend quota associated with said first travel provider;

transmitting said comparison to said yield management system;

transforming, via said yield management system, said first selling instructions into second selling instructions based upon said comparison wherein said second selling instructions are configured to fulfill a second monthly travel spend quota with a second travel provider;

storing said second selling instructions in said yield management system;

communicating, using said network and said yield management system, said second selling instructions to said booking system; and verifying, by said yield management system, that said second selling instructions are fulfilled without modification so that said second monthly travel spend quota is at least partially achieved.

12. The article of manufacture of claim 11, wherein said reservations are airline travel reservations.

13. The article of manufacture of claim 11, the operations further comprising determining said contract data to be used in said acquiring step.

14. The article of manufacture of claim 11, wherein said contract data are derived from terms and conditions of contracts between corporations and airlines and include a name of airline, target percentage, destination city and origination city.

15. The article of manufacture of claim 11, wherein said booking system facilitates reservations automatically in accordance with said second selling instructions.

16. The article of manufacture of claim 12, wherein said booking activity comprises a number of seats reserved on a particular airline between a particular city pair.

17. The article of manufacture of claim 16, the operations further comprising receiving airline information from said first travel provider via said network.

18. The article of manufacture of claim 11, wherein said booking system facilitates online reservations.

19. The article of manufacture of claim 11, wherein said booking system facilitates automated telephone reservation.

20. The article of manufacture of claim 11, wherein said booking system facilitates in-person airline reservations.

* * * * *